Sept. 20, 1966  D. I. McDONALD  3,273,182
FEED CONTROL DEVICE TO FEED TOOL SPINDLE
AT RATE OF TOOL ADVANCE Filed March 6, 1961  2 Sheets-Sheet 1

INVENTOR.
DAVID I. McDONALD

BY
Howard O. Keiser
& John F. Verhoeven
ATTORNEYS

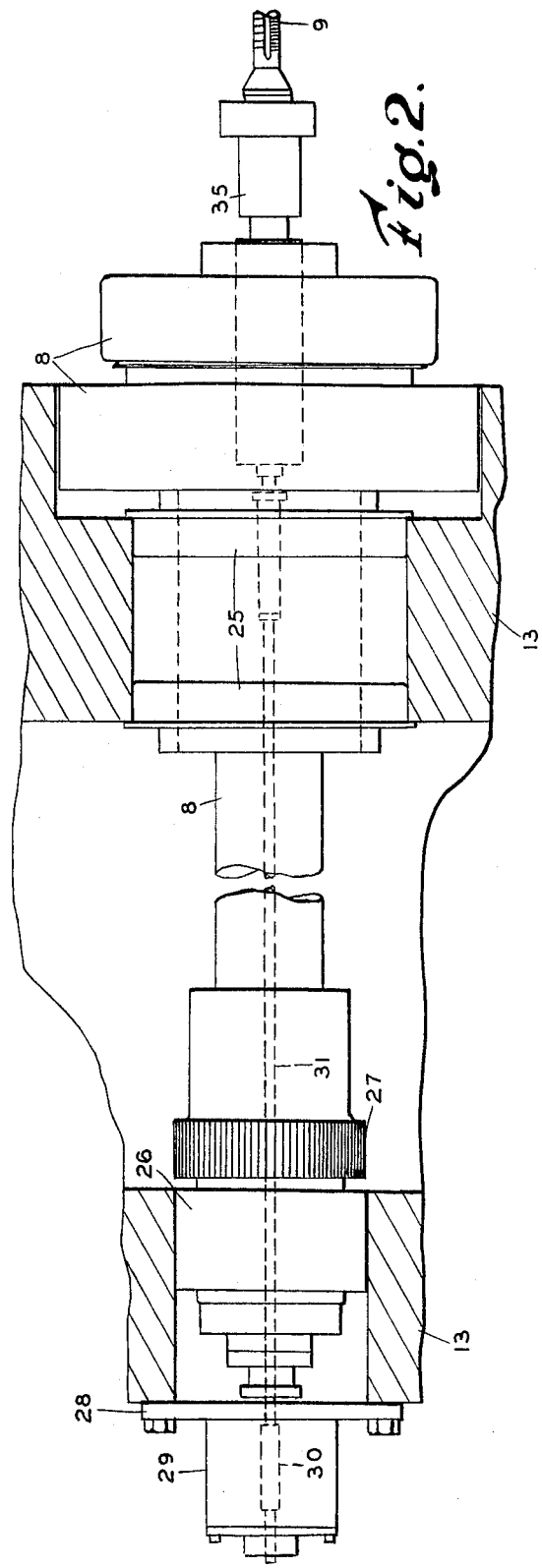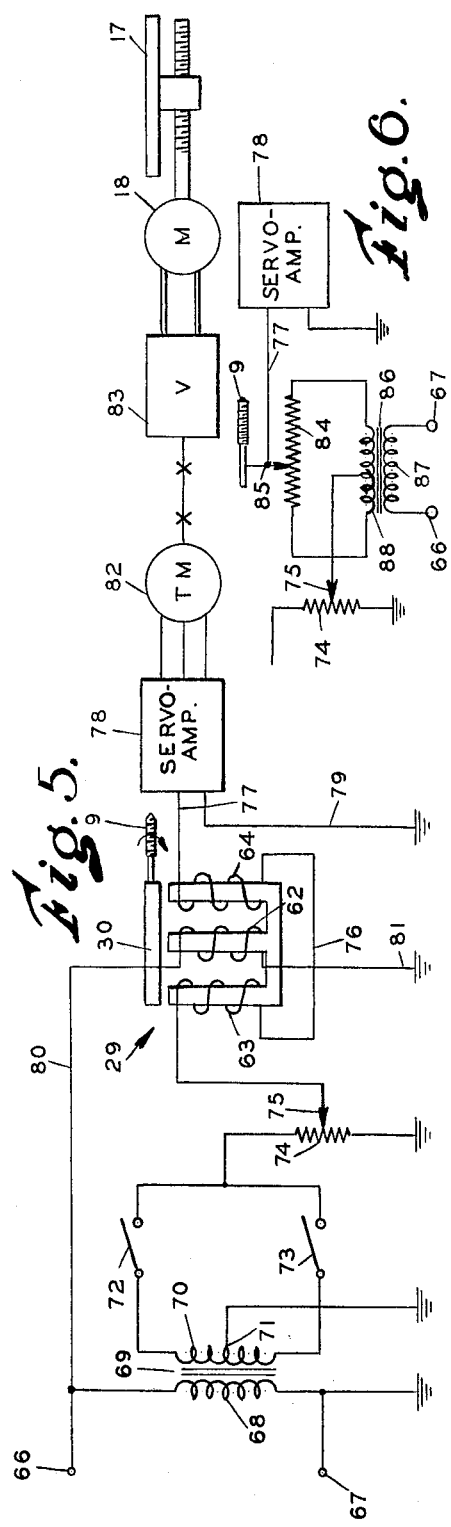

United States Patent Office 3,273,182
Patented Sept. 20, 1966

3,273,182
FEED CONTROL DEVICE TO FEED TOOL SPINDLE AT RATE OF TOOL ADVANCE
David I. McDonald, Cincinnati, Ohio, assignor to The Cincinnati Milling Machine Co., Cincinnati, Ohio, a corporation of Ohio
Filed Mar. 6, 1961, Ser. No. 93,798
8 Claims. (Cl. 10—139)

This invention relates to a feed control device and, more particularly, to an apparatus for automatically controlling the feed of a tool relative to the work in accordance with changes in the axial pressure acting on the tool.

In the past it has been customary in tapping operations to cause the feedrate of the tap to coincide approximately with the pitch of the thread multiplied by the revolutions per minute of the spindle. To take care of any discrepancy between the feedrate provided to the spindle and the feedrate required by the tap, enough "float" was provided between the tap and the spindle to take care of this difference in the two feeding movements. This arrangement has proved satisfactory in most cases but not in all. For instance, when a hole is to be tapped to a precise depth, as in the case of certain blind hole tapping operations, this method is wholly unsuitable. This is due to the fact that the amount of "float" provided between the tap and the spindle makes it impossible to tell with any certainty or precision where the end of the tap may be located at any particular moment. If the operator misjudges the location of the tap and runs it into the end of the hole, the tap will be broken off in the hole and the workpiece will be spoiled. To eliminate this difficulty and, also, to avoid the need for elaborate changegear mechanisms in order to adjust the feedrate as required for different thread pitches, the device herein disclosed has been devised. According to the new arrangement, the tap is provided with "float" as before but now the axial movement of the tap relative to the spindle is utilized to control the feed of the tap relative to the work. The feeding movement of the tap is thereby automatically synchronized with the rotation of the spindle and this is accomplished with very small shifting movements of the tap relative to the spindle. More specifically, it has been found that only a few thousandths of an inch of movement is all that is needed to exert the full range of control over the feed of the tap relative to the work.

According to another feature of the invention, if the tap is not in correct alignment with the hole to be tapped so that, as a consequence, the end of the tap is caused to strike against the face of the work, the resulting deflection of the tap will instantly reduce the feed to zero and thus prevent damage either to the tap, the work, or the machine.

The present device may also be used in any application where the axial thrust on a tool is to be kept below a predetermined maximum value. For example, in the case of a tool such as a reamer, any axial shifting movement of the tool relative to the spindle against the opposition of a centering spring, whether caused from a buildup of chips or from programming of the wrong depth of hole, will cause the feedrate to be reduced to zero and prevent damage.

Accordingly, it is an object of the present invention to provide a novel feed control device which causes the axial force acting on a tool to control the rate of feed of the tool relative to the work.

Another object of the invention is to provide an improved tapping apparatus in which the feed of the tap is automatically synchronized with the rotation of the spindle through a servomechanism which is controlled by movement of the tap relative to the spindle.

Another object of the invention is to provide a tapping device in which a differential transformer controls the feedrate of the tap in accordance with axial movements of the tap relative to the spindle.

Another object of the invention is to provide a tapping device in which the windings of a differential transformer are mounted adjacent the end of the spindle and the armature of the transformer is arranged to be operated by a pushrod connected to the tap and extending through the center of the spindle.

Another object of the invention is to provide a tapping device of the type described in any of the preceding objects in which the tap is held against axial movement relative to the spindle by a centering spring acting against opposed, fixed abutments.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 2 is a cross-sectional view taken along the line 2—2 in FIG. 1.

FIG. 5 is a schematic view of the control apparatus for the tapping device.

FIG. 6 illustrates a modified form of the invention.

Figure 1:
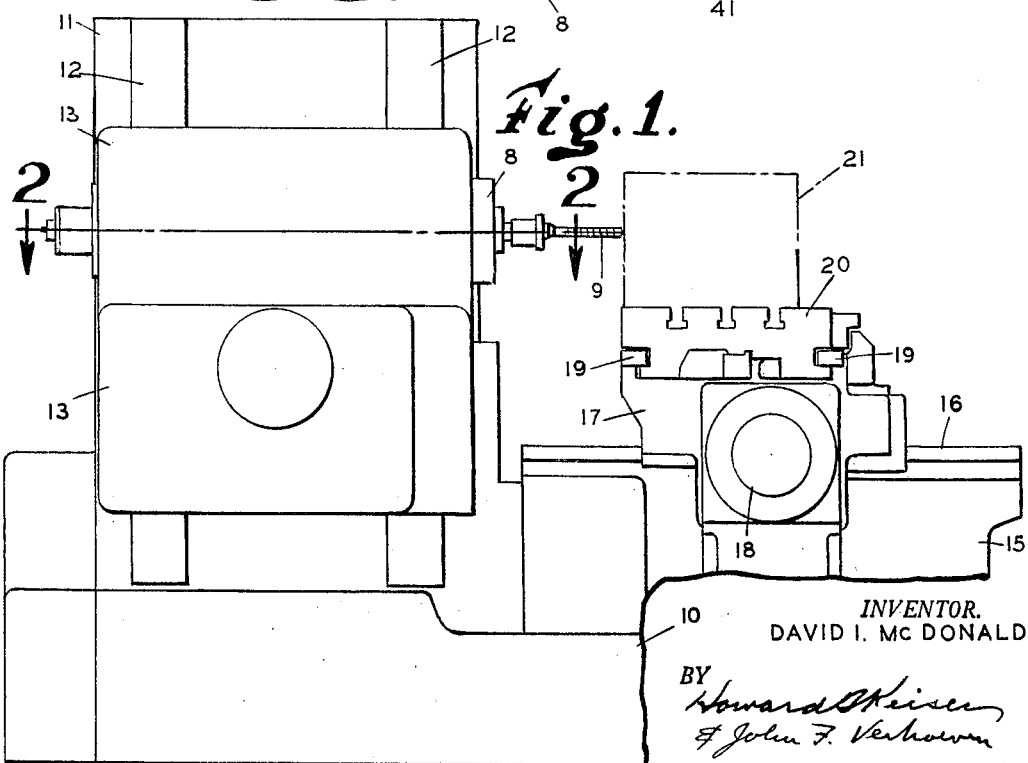
FIG. 1 is a side elevation of a horizontal milling machine to which the invention is shown applied.

While the device forming the subject matter of the present invention can be applied to any form of machine tool in which relative feeding movement can be provided between a rotary spindle and a work support, the type of machine chosen for the exemplification of the present invention is a horizontal milling machine of the fixed bed type as shown in FIG. 1. As therein shown, the machine is provided with a bed 10 having a column 11 on which is provided a pair of vertical ways 12. Slidably mounted on the ways 12 is a spindle carrier 13 in which is mounted a spindle 8 carrying a tap 9. The spindle carrier also supports a spindle drive motor and suitable change-speed gearing for driving the spindle at selected speeds in accordance with well known practice. The bed 10 also includes an extension 15 having a pair of horizontal ways 16 on which a saddle 17 is mounted for sliding movement. A hydraulic motor 18 mounted on the saddle serves to drive the saddle back and forth along the ways 16. The upper portion of the saddle is provided with a pair of horizontally extending ways 19 which are disposed at right angles to the ways 16 and provide support for a table 20 to which a workpiece 21 may be secured. By virtue of the mutually perpendicular arrangement of the three slides 13, 17 and 20, it is possible to adjust the tap 9 relative to the workpiece 21 so as to align the tap with the hole to be tapped and thereafter to feed it into the hole to be tapped by driving the saddle toward the spindle by means of motor 18.

As shown in FIG. 2, the spindle 8 is journaled for rotation in the spindle carrier 13 by antifriction bearings 25 and 26. A drive gear 27 is mounted securely on the spindle for effecting a driving connection between the spindle and the spindle drive motor. This driving connection may include suitable change-speed gearing to permit the spindle to be operated at selected speeds in accordance with conventional practice. Secured to the spindle carrier adjacent the rear end of the spindle 8 is a mounting plate 28 which supports a differential transformer 29. The transformer includes a core 30 which is connected to a pushrod 31 extending through the hollow interior of the spindle 8 and arranged to be operated by axial shifting movements of the tap as will be explained hereinafter.

Figure 3:
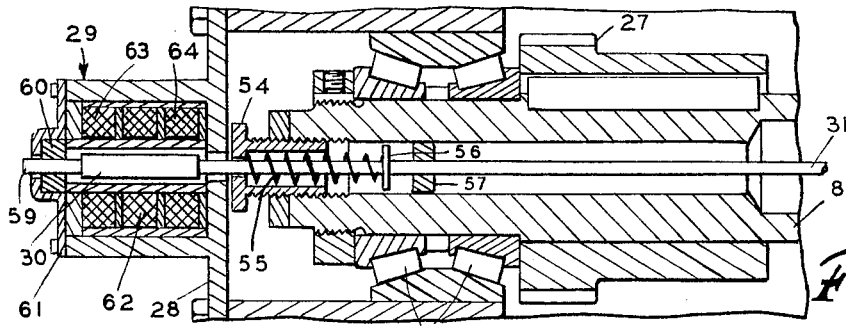
FIG. 3 is a detailed cross-sectional view of the rear end of the spindle shown in FIG. 2.
Figure 4:
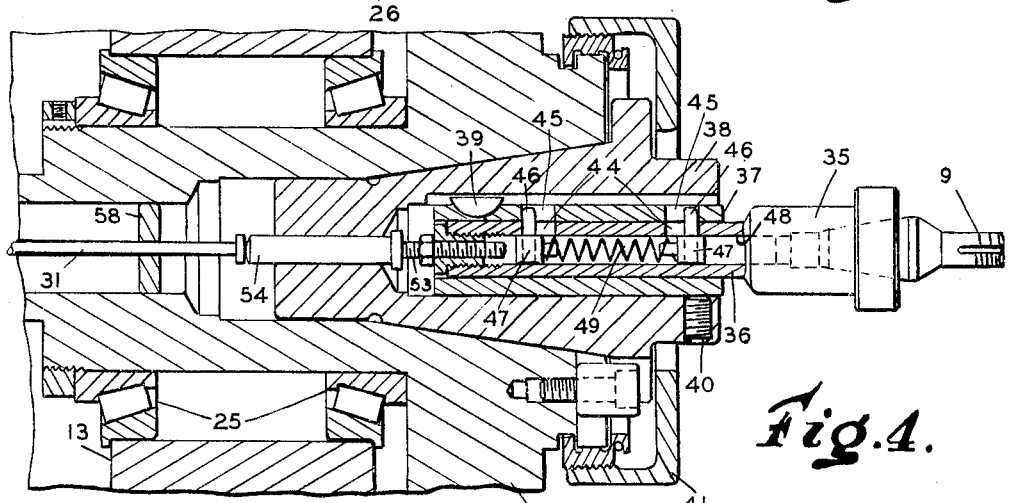
FIG. 4 is a detailed cross-sectional view of the front end of the spindle shown in FIG. 2.

Referring now to FIGS. 3 and 4 which show in greater detail the parts shown in FIG. 2, it will be noted that the tap 9 is mounted in a holder 35 having a tubular shank portion 36 which is received in a sleeve 37 held in an arbor 38 by a key 39 and a set screw 40. The arbor 38 is received in the taper provided in the spindle nose and is held securely therein by a lock nut 41 and related parts which are of well known construction and form no part of the present invention.

The tubular extension 36 of the holder 35 is arranged to have a close sliding fit within the sleeve 37 where it is provided with a pair of longitudinally extending slots 44 adapted to line up with a pair of similar slots 45 in the sleeve 37. Received in the slots 44 and 45 are pins 46 projecting from cylindrical plungers 47 slidably received in a bore 48 provided in the extension 36. The plungers 47 are urged apart by a compression spring 49 which is compressed between the plungers as shown in FIG. 4. Hence, the pins 46 will be held against the outer ends of slots 44 and 45 with a predetermined force and cause the holder 35 to be held in a centered position within the sleeve 37. The holder 35, however, is capable of limited axial movement within the sleeve 37 when sufficient force is applied thereto, in either direction, to overcome the force of the spring 49. It will be seen that movement of the holder in either direction from the position shown in FIG. 4 will cause one of the plungers 47 to be moved toward the other plunger thereby compressing the spring 49. The extent of movement permitted the tap is limited by the inner edges of slots 44 and 45 and is dimensionally equal to the length of a slot minus the diameter of a pin 46. For proper operation of the tapping device, the force exerted by the spring 49 tending to retain the holder 35 in its centered position should be somewhat greater than the force required to start the tap 9 into a drilled hole in the work. In other words, the holder 35 should not shift axially with respect to the spindle when the tap is started into the hole.

At its rear end, the extension 36 is provided with an adjustment screw 53 which bears against one end of a plunger 54 slidably mounted in the rear end of the arbor 38. The opposite end of the plunger 54 abuts against the forward end of the pushrod 31 which extends through the hollow interior of the spindle 8. At its rear end, the spindle is fitted with a threaded plug 54' which is apertured to permit the pushrod to pass therethrough. The pushrod is urged toward the right, as viewed in FIGS. 3 and 4, by a compression spring 55 which is compressed between the end of plug 54 and a washer 56 fastened to the pushrod. The pushrod is guided for axial shifting movements within the spindle 8 by bushings 57 and 58.

At its rear end, the pushrod 31 is connected to the core 30 which is provided on its left-hand end with an extension 59 supported in a bushing 60 held by a cap 61 covering the end of the differential transformer. Cooperating with the core 30 are transformer windings 62, 63 and 64, the winding 62 comprising the primary winding of the transformer while the windings 63 and 64 comprise the secondary windings thereof. It will be apparent from the foregoing description that movement of the holder 35 (FIG. 4) in either direction will cause corresponding movement of the core 30 of the differential transformer.

The manner in which the axial displacement of the core 30 controls the feedrate of the saddle relative to the spindle, may be understood from the schematic view of the control system shown in FIG. 5. Starting at the left-hand side of the figure, a pair of terminals 66 and 67 are connected to a source of alternating electric current of suitable voltage and frequency. Connected between the terminals is the primary winding 68 of a transformer 69 which provides a source of feedrate voltage for moving the saddle 17 back and forth on the bed of the machine at a selected feedrate. The transformer is provided with a secondary winding 70 which has a center tap 71 connected to ground as shown. The ends of the winding 70 are connected through normally open switches 72 and 73 to the upper end of a potentiometer 74, the opposite end of which is connected to ground. The slider 75 of the potentiometer is connected to one end of the secondary winding 63 of the differential transformer 29. The other end of this winding is connected to one end of the secondary winding 64 by a conductor 76, as shown. The other end of the secondary winding 64 is connected by a lead 77 to one input terminal of a servoamplifier 78. The other terminal of the amplifier is connected by a conductor 79 to ground.

The primary winding of the differential transformer is energized from the alternating current source by the connections 80 and 81 as shown in FIG. 5. Hence, when the core 30 is in its central or null position with respect to the windings 63 and 64 of the transformer, the input to the servoamplifier 78 will likewise be at a null so long as the switches 72 and 73 remain open. When a signal is impressed across the input terminals of the servoamplifier either by closing of one of the switches 72 or 73 or by displacement of the core 30 of the differential transformer, an output signal will be transmitted to a torque motor 82 of an electrohydraulic valve 83 which controls the operation of the saddle drive motor 18. Hence the motor will be operated in one direction or the other and move the saddle 17 accordingly. It will be understood in connection with the servomechanism shown in FIG. 5 that when the core 30 is displaced in one direction or the other due to a discrepancy in the feedrate of the saddle relative to the rotary motion of the tap, the phase of the signal produced by the transformer 29 will be such as to rotate the motor 18 in a direction which will restore the core 30 to its neutral position. Thus, the feedrate of the saddle will be caused to follow exactly the axial movement of the tap into or out of the hole resulting from rotation of the spindle. It will also be understood from the diagram shown in FIG. 5 that a feedrate voltage of one phase or the other may be applied to the input of the servoamplifier by closing of the appropriate switch 72 or 73. Likewise, the feed rate may be adjusted as desired by manipulation of the slider 75 of the potentiometer 74.

The operation of the tapping device is as follows: The hole in the workpiece 21 which is to be tapped is moved into alignment with the tap 9 by suitable adjustment of the spindle carrier 13 and table 20 of the machine tool. Once the tap has been aligned with the center of the hole, the spindle 8 is set into motion at a speed appropriate for the tap 9 being used. The saddle 17 is then fed toward the spindle by closing switch 72, the feedrate being adjusted as desired by the slider 75 of the potentiometer. Once the tap has entered the hole, the switch 72 may be reopened since deflections of the core will now cause the saddle to move at the exact feedrate required to maintain the holder 35 (FIG. 4) in its centered position within the sleeve 37. When the tap has reached the correct depth, the machine operator stops the spindle thereby stopping the saddle 17. Reverse rotation of the spindle will now cause the saddle to back away from the tap at a feedrate determined by the reverse rotational speed of the spindle. After the tap has left the hole, the saddle may be moved away from the spindle by closure of the switch 73 until the saddle has been moved to the desired position whereupon the switch is opened thereby stopping the saddle.

The purpose of selecting a spring 49 which is sufficiently stiff to prevent deflection of the holder 35 relative to the spindle 8 upon engagement of the tap with the workpiece will now be understood. That is, should the spring permit a deflection of the holder upon engagement of the tap with the work, the core 30 would be shifted to the left as viewed in FIG. 3 thereby providing a signal to the servomechanisms tending to slow down or stop the saddle 17. Hence, it would be impossible to start the tap into the hole if such deflection were to occur.

As mentioned earlier herein the herein disclosed control of the saddle feed in accordance with deflections of the tap holder 35 may be made sufficiently sensitive so that maximum deflection of the core 30 of the differential transformer will be in the neighborhood of plus or minus .003 inch. Hence, the operator by observing the location of the saddle will know exactly to what depth the tap has entered the work. This, together with the elimination of the need to adjust the feedrate of the saddle for the different taps being used in threading a plurality of holes in a workpiece, renders the present apparatus particularly desirable for use in connection with numerically controlled machine tools.

A modified form of the invention is shown in FIG. 6 wherein a linear potentiometer 84 having a wiper 85 is substituted for the differential transformer 29. The potentiometer is energized with alternating current derived from a transformer 86 having a primary winding 87 connected to the supply terminals 66 and 67, as shown. A center-tapped secondary winding 88 is connected across the potentiometer, and the centertap is electrically connected to the wiper 75 of potentiometer 74. The wiper 85 is mechanically connected to the tap 9 and is also electrically connected to the input lead 77 of the servoamplifier 78.

The operation of the device using the circuit shown in FIG. 6 is the same as previously described in connection with FIG. 5. That is, when the switches 72 and 73 are open, the center of the potentiometer winding 84 is effectively held at ground potential by the center tap of secondary winding 88. Movement of the slider 85 in either direction from the central or "null" position will cause a voltage of one phase or the other to be applied to servoamplifier 78. Thus, the direction of operation of motor 18 will be controlled in accordance with the direction of axial shift of the tap relative to the spindle. Closure of switch 72 or 73 will cause a feedrate voltage of one phase or the other to be supplied to input lead 77 via the potentiometer 74, winding 88 and potentiometer 84. Any shifting of the wiper 85 while switch 72 or 73 is closed will cause the input voltage to the servoamplifier to be increased or decreased with a consequent variation in the speed of the feed motor 18.

It will be appreciated that other types of deflection sensing devices might be used in place of the differential transformer and potentiometer shown herein. For instance, there might be employed for this purpose various forms of pneumatic, optical and electromagnetic devices. Hence, it is to be understood that the present disclosure is illustrative rather than restrictive and that changes and modifications may be resorted to without departing from the invention as described by the claims which follow.

What is claimed is:

1. A device for automatically synchronizing the feeding movement of a tap with its speed of rotation comprising a work support for holding a workpiece to be tapped, a power operated spindle disposed adjacent said work support, a tap holder supported in said spindle for limited axial movement relative thereto, a differential transformer, means operatively connecting said transformer with said holder so as to cause a signal to be produced by said transformer upon axial displacement of said holder in said spindle, and a servomechanism controlled by the signal from said transformer for feeding said spindle relative to said work support at a rate equal to the rate at which the tap threads its way into the workpiece upon rotation of the spindle.

2. The synchronizing device of claim 1 including means for yieldably locating said holder in a centered position in said spindle.

3. The synchronizing device of claim 2 including means to supply a constant feed rate signal to said servomechanism with said holder in its centered position.

4. The synchronzing device of claim 1 wherein said differential transformer includes an armature and a plurality of transformer windings, said armature being movable with said holder relative to said spindle and said windings being mounted adjacent the end of said spindle.

5. The synchronizing device of claim 4 wherein said armature is operatively connected with said holder by a pushrod extending through the center of said spindle and supported therein for axial sliding movement in response to movement of said holder.

6. A feed control device for a machine tool comprising a spindle, a threading tool supported in said spindle for axial movement relative thereto, means for yieldably holding said tool against axial displacement from a normal position, a work support for holding a workpiece in position to be machined by said tool, sensing means operatively connected between said tool and said spindle for producing a signal which is infinitely variable within limits in accordance with the extent of axial displacement of said tool from said normal position during a machining operation, a motor for effecting feeding movement of said spindle relative to said work support; and means responsive to the signal from said sensing means for controlling the operation of said feed motor in accordance with the displacement of said tool from its normal position so as to maintain the rate of advance of the spindle equal to that of the tool.

7. A feed control device for a machine tool comprising a spindle, a tool holder, means mounted in said spindle for supporting said tool holder for axial movement relative thereto, a work support for holding a workpiece in position to be machined by a threading tool mounted in said tool holder, abutments on said holder and on said supporting means, resilient means acting between said abutments to yieldably retain said holder in a predetermined position relative to said supporting means and said spindle, sensing means operatively connected between said tool holder and said spindle for producing a signal which is infinitely variable within limits in accordance with the extent of axial displacement of said tool holder from said predetermined position, means for effecting feeding movement of said spindle relative to said work support, and means controlled by the signal produced by said sensing means for causing the feeding means to operate at a rate substantially proportional to the extent to which the tool holder is displaced from said predetermined position so as to maintain the rate of advance of the spindle equal to that of the tool.

8. A feed control device for automatically maintaining axial feeding movement of a spindle relative to a work support equal to the rate of advance of a tap into a workpiece mounted on the work support as the tap is rotated by the spindle, comprising a tap holder supported in said spindle for limited axial movement relative thereto, means operatively connected between said tap holder and said spindle for sensing axial displacement of said tap holder relative to said spindle and for producing a signal which is infinitely variable within limits in accordance with the extent of said displacement, means for effecting feeding movement of said spindle relative to said work support, and means controlled by the signal produced by said sensing means for causing the feeding means to operate at a rate substantially proportional to the extent to which the tap holder is displaced relative to said spindle so as to maintain the rate of advance of the spindle equal to that of the tap.

References Cited by the Examiner
UNITED STATES PATENTS

| | | | |
|---|---|---|---|
| 1,961,090 | 5/1934 | Smith et al. | 82—29.1 |
| 2,759,580 | 8/1956 | Bower | 192—21.5 |
| 2,916,931 | 12/1959 | Cunningham | 10—105 |
| 2,973,013 | 2/1961 | Myers. | |
| 3,052,011 | 9/1962 | Brainard et al. | 77—5 |

ANDREW R. JUHASZ, *Primary Examiner.*

WILLIAM W. DYER, JR., *Examiner.*

C. B. ELDERKIN, *Assistant Examiner.*